(12) United States Patent
Yang et al.

(10) Patent No.: US 11,864,114 B2
(45) Date of Patent: Jan. 2, 2024

(54) WAKE-UP SIGNAL SENDING AND RECEIVING METHOD, WAKE-UP SIGNAL SENDING AND RECEIVING APPARATUS, AND STORAGE MEDIUM

(71) Applicant: ZTE CORPORATION, Shenzhen (CN)

(72) Inventors: Weiwei Yang, Shenzhen (CN); Bo Dai, Shenzhen (CN); Huiying Fang, Shenzhen (CN); Kun Liu, Shenzhen (CN); Luanjian Bian, Shenzhen (CN); Youjun Hu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 407 days.

(21) Appl. No.: 17/267,734

(22) PCT Filed: Aug. 5, 2019

(86) PCT No.: PCT/CN2019/099234
§ 371 (c)(1),
(2) Date: Feb. 10, 2021

(87) PCT Pub. No.: WO2020/029913
PCT Pub. Date: Feb. 13, 2020

(65) Prior Publication Data
US 2021/0329558 A1 Oct. 21, 2021

(30) Foreign Application Priority Data
Aug. 10, 2018 (CN) .......................... 201810907793.3

(51) Int. Cl.
*H04W 52/02* (2009.01)
*H04W 72/23* (2023.01)

(52) U.S. Cl.
CPC ... *H04W 52/0235* (2013.01); *H04W 52/0229* (2013.01); *H04W 72/23* (2023.01)

(58) Field of Classification Search
None
See application file for complete search history.

(56) References Cited

U.S. PATENT DOCUMENTS

2017/0070959 A1* 3/2017 Khazanov .......... H04W 52/0235
2018/0332549 A1* 11/2018 Bhattad ............... H04W 56/001
(Continued)

FOREIGN PATENT DOCUMENTS

| CN | 101309435 A | 11/2008 |
| CN | 101557408 A | 10/2009 |
| CN | 107018497 A | 8/2017 |

OTHER PUBLICATIONS

LG Electronics, "Discussion on wake up signal function in NB-Iot" 3GPP TSG RAN WG1 Meeting #92, Athens Greece, Feb. 26-Mar. 2, 2018, R1-1802165.
International Search Report for PCT/CN2019/099234 dated Oct. 30, 2019.
Ericsson: *Wake-up signal configurations and procedures for NB-IoT*, 3GPP Draft; R1-1801489 Wake-Up Signal Configurations and Procedures for NB-IOT 3rd Gen Partnership Project (3GPP) Mobile Competence Centre, France.
(Continued)

*Primary Examiner* — Clemence S Han
(74) *Attorney, Agent, or Firm* — Knobbe, Martens, Olson & Bear, LLP

(57) ABSTRACT

Provided are wake-up signal sending and receiving methods and apparatuses and storage media. The wake-up signal sending method includes sending a WUS by using at least one of a first sending manner: sending a first WUS in a first basic unit and sending a second WUS in a second basic unit; a second sending manner: determining, according to a preset condition, whether a third WUS or a fourth WUS is sent in a basic unit; a third sending manner: determining, according to first signaling, whether the fourth WUS is sent in the basic unit or one of the third WUS or the fourth WUS is sent in the basic unit; or a fourth sending manner: determining, according to second signaling and a basic unit index, a fifth WUS sent in the basic unit.

10 Claims, 1 Drawing Sheet

Sending a WUS by using at least one of a first sending manner, a second sending manner, a third sending manner or a fourth sending manner — S101

(56) References Cited

U.S. PATENT DOCUMENTS

| | | | |
|---|---|---|---|
| 2019/0312758 A1* | 10/2019 | Liu | H04L 5/0048 |
| 2019/0349856 A1* | 11/2019 | Liu | H04W 72/0453 |
| 2020/0022082 A1* | 1/2020 | Ljung | H04J 13/0048 |
| 2020/0029302 A1* | 1/2020 | Cox | H04W 68/02 |
| 2020/0037247 A1* | 1/2020 | Liao | H04W 72/0453 |
| 2020/0053647 A1* | 2/2020 | Chae | H04W 52/0229 |
| 2020/0145921 A1* | 5/2020 | Zhang | H04W 52/0229 |
| 2020/0178176 A1* | 6/2020 | Kim | H04W 52/0212 |
| 2020/0229095 A1* | 7/2020 | Shrestha | H04W 8/08 |
| 2021/0014825 A1* | 1/2021 | Shi | H04W 52/0229 |
| 2021/0037469 A1* | 2/2021 | Åström | H04W 68/005 |
| 2021/0153120 A1* | 5/2021 | Atungsiri | H04L 27/2636 |
| 2021/0227467 A1* | 7/2021 | Liu | H04W 52/0235 |
| 2021/0367707 A1* | 11/2021 | Wu | H04J 13/0029 |
| 2021/0385034 A1* | 12/2021 | Hwang | G16Y 10/75 |

OTHER PUBLICATIONS

Vivo: *Remaining aspects on wake-up signals for feNB-IoT*, 3GPP Draft; R1-1803805 Remaining Aspects on Wake-Up Signals for FENB-IOT, 3$^{rd}$ Gen Partnership Project (3GPP) Mobile Competence Centre, France.

Intel Corporation: *Open issue in WUS*, 3GPP TSG RAN WG2 Meeting #102, Busan, ROK (May 25, 2018).

Apr. 12, 2022 European Supplemental Search Report for EP 19848051.9 (12 pgs).

May 24, 2022 2$^{nd}$ Chinese Office Action for CN 201810907793.3 (24 pgs).

May 17, 2022 Chinese Supplemental Search Report for CN 201810907793.3 (4 pg).

* cited by examiner

Sending a WUS by using at least one of a first sending manner, a second sending manner, a third sending manner or a fourth sending manner — S101

FIG. 1

Receive a WUS — S201

Detect the WUS by using at least one of a first detection manner, a second detection manner, a third detection manner or a fourth detection manner — S202

FIG. 2

Sending unit — 31

FIG. 3

Receiving unit — 41

Detection unit — 42

FIG. 4

WAKE-UP SIGNAL SENDING AND RECEIVING METHOD, WAKE-UP SIGNAL SENDING AND RECEIVING APPARATUS, AND STORAGE MEDIUM

CROSS-REFERENCE TO RELATED APPLICATIONS

This is a National Stage Application, filed under 35 U.S.C. 371, of and claims priority to International Patent Application No. PCT/CN2019/099234, filed on Aug. 5, 2019, which claims priority to Chinese Patent Application No. 201810907793.3 filed on Aug. 10, 2018, the disclosures of both of which are incorporated herein by reference in their entireties.

TECHNICAL FIELD

The present application relates to the field of communication technologies and, in particular, to wake-up signal (WUS) sending and receiving methods and apparatuses and storage media.

BACKGROUND

Machine type communication (MTC), also known as machine to machine (M2M), is the main application form of the Internet of things at the present stage. MTC devices deployed on the market are primarily based on the Global System for Mobile Communications (GSM). In recent years, due to the high spectral efficiency of Long-Term Evolution (LTE)/Long Term Evolution-Advanced (LTE-A), more and more mobile operators select LTE/LTE-A as the evolution direction of the future broadband wireless communication system. Various LTE-based/LTE-A-based MTC data traffic will also be more attractive.

Several technologies applicable to Cellar Internet of Things (C-IoT) are published in the technical report TR45.820V200 of the 3rd Generation Partnership Project (3GPP). Among these technologies, Narrowband Internet of Things (NB-IoT) is the most eye-catching. NB-IoT focuses on low-complexity and low-throughput radio frequency access technologies. The main research objectives of NB-IoT include improved indoor coverage, support for massive low-throughput user devices, low latency sensitivity, ultra-low device costs, low device power loss, and network architecture.

A network may send paging to user equipments (UEs) in the idle state and in the connected state. A paging process may be triggered by the core network and used for instructing a UE to receive a paging request or may be triggered by an Evolved Node B (eNB) and used for notifying an update of system information. A paging message is scheduled using a physical downlink control channel (PDCCH) scrambled by a paging radio network temporary identifier (P-RNTI) and is sent in a physical downlink shared channel (PDSCH). A terminal detects whether the corresponding PDCCH is present in a paging occasion (PO) to determine whether the PDSCH indicated by the PDCCH carries a paging message. If the terminal detects no corresponding PDCCH in the PO, no paging message is present in the PO. In this case, the terminal enters the sleep state and does not receive data or perform detection until the next PO. This is called discontinuous reception (DRX). That is, the terminal needs to perform blind detection of a PDCCH on each PO, causing a large power loss of the terminal.

To reduce the power loss of a terminal, a wake-up signal (WUS) is introduced. A base station sends, before each PO, a signal indicating whether to detect a PDCCH. The terminal first detects the WUS and then determines, based on the detection result of the WUS, whether to detect the corresponding PDCCH. When the WUS is detected, the terminal detects the PDCCH corresponding to the WUS; otherwise, the terminal does not detect a PDCCH. The introduction of the WUS signal reduces the number of times the terminal detects a PDCCH, thereby reducing the power loss of the terminal.

However, in the related art, a type of WUS is used for all terminals in a PO. That is, when one terminal needs to be awakened, a base station sends WUSs to awaken this terminal and other terminals belonging to the same PO. In this case, all of the awakened terminals detect a PDCCH. This increases the number of times a terminal performs unnecessary detection of a PDCCH, limiting the effect of power loss reduction of the terminal.

SUMMARY

Embodiments of the present disclosure provide wake-up signal sending and receiving methods and apparatuses and storage media to solve the problem in which in the related art, a sent WUS awakens a terminal that does not need to be awakened in a PO, limiting the effect of power loss reduction of the terminal.

A first embodiment of the present application provides a wake-up signal (WUS) sending method. The method includes sending a WUS by using at least one of: a first sending manner: sending a first WUS in a first basic unit and sending a second WUS in a second basic unit; a second sending manner: determining, according to a preset condition, whether a third WUS or a fourth WUS is sent in a basic unit; a third sending manner: determining, according to first signaling, whether the fourth WUS is sent in the basic unit or one of the third WUS or the fourth WUS is sent in the basic unit; or a fourth sending manner: determining, according to second signaling and a basic unit index, a fifth WUS sent.

A second embodiment of the present application provides a WUS receiving method. The method includes receiving a WUS; and detecting the WUS by using at least one of: a first detection manner: performing detection in a first basic unit according to a first WUS and performing detection in a second basic unit according to a second WUS; a second detection manner: determining, according to a preset condition, whether detection is performed in a basic unit according to a third WUS, according to a fourth WUS or according to the third WUS and the fourth WUS; a third detection manner: determining, according to first signaling, whether detection is performed in the basic unit according to the fourth WUS or according to the third WUS and the fourth WUS; or a fourth detection manner: determining, according to second signaling, that detection is performed in the basic unit according to a fifth WUS.

A third embodiment of the present application provides a wake-up signal (WUS) sending apparatus. The apparatus includes a sending unit.

The sending unit is configured to send a WUS by using at least one of: a first sending manner: sending a first WUS in a first basic unit and sending a second WUS in a second basic unit; a second sending manner: determining, according to a preset condition, whether a third WUS or a fourth WUS is sent in a basic unit; a third sending manner: determining, according to first signaling, whether the fourth WUS is sent in the basic unit or one of the third WUS or the fourth WUS is sent in the basic unit; or a fourth sending manner: determining, according to second signaling and a basic unit index, a fifth WUS sent.

A fourth embodiment of the present application provides a wake-up signal (WUS) receiving apparatus. The apparatus includes a receiving unit and a detection unit.

The receiving unit is configured to receive a WUS.

The detection unit is configured to detect the WUS by using at least one of: a first detection manner: performing detection in a first basic unit according to a first WUS and performing detection in a second basic unit according to a second WUS; a second detection manner: determining, according to a preset condition, whether detection is performed in a basic unit according to a third WUS, according to a fourth WUS or according to the third WUS and the fourth WUS; a third detection manner: determining, according to first signaling, whether detection is performed according to the fourth WUS or according to the third WUS and the fourth WUS; or a fourth detection manner: determining, according to second signaling, that detection is performed in the basic unit according to a fifth WUS.

A fifth embodiment of the present application provides a base station. The base station includes the WUS sending apparatus of the third embodiment of the present application.

A sixth embodiment of the present application provides a terminal. The terminal includes the WUS receiving apparatus of the fourth embodiment of the present application.

A seventh embodiment of the present application provides a computer-readable storage medium storing a computer program for signal mapping. The WUS sending method of the first embodiment of the present application is performed when the computer program is executed by at least one processor.

An eighth embodiment of the present application provides a computer-readable storage medium storing a computer program for signal mapping. The WUS receiving method of the second embodiment of the present application is performed when the computer program is executed by at least one processor.

In embodiments of the present disclosure, a WUS is sent to only a terminal that needs to be awakened. In this way, the following problem is effectively solved: In the related art, the sent WUSs awaken all terminals in a PO; as a result, a terminal that does not need to be awakened also has to detect a PDCCH, and the effect of power loss reduction of the terminal is thus not apparent. Additionally, in embodiments of the present disclosure, the problem of excessive resource overheads caused by grouped WUSs in special scenarios is solved.

BRIEF DESCRIPTION OF DRAWINGS

FIG. 1 is a flowchart of a WUS sending method according to a first embodiment of the present application.

FIG. 2 is a flowchart of a WUS detection method according to a third embodiment of the present application.

FIG. 3 is a structure diagram of a WUS sending apparatus according to a fifth embodiment of the present application.

FIG. 4 is a structure diagram of a WUS detection apparatus according to a sixth embodiment of the present application.

DETAILED DESCRIPTION

Various embodiments of the present application are described in detail hereinafter with reference to drawings.

The drawings illustrate the various embodiments of the present application, but it is to be understood that the present application may be implemented in various manners and is not to be limited to the embodiments set forth herein. On the contrary, these embodiments are provided for a thorough understanding of the present application and to fully convey the scope of the present application to those skilled in the art.

In embodiments of the present disclosure, grouped WUSs or ungrouped WUSs are sent so that the following problem is solved: In the related art, sent WUSs awaken all terminals in a PO; as a result, the number of times a terminal performs unnecessary detection of a PDCCH is increased, and the effect of power loss reduction of the terminal is thus not apparent. Additionally, in embodiments of the present disclosure, the problem of excessive resource overheads caused by grouped WUSs in special scenarios is solved. The methods described in the present application are illustrated in detail hereinafter by using some examples.

A first embodiment of the present application provides a wake-up signal (WUS) sending method. Referring to FIG. 1, the method includes S101.

In S101, a WUS is sent by using at least one of a first sending manner: sending a first WUS in a first basic unit and sending a second WUS in a second basic unit; a second sending manner: determining, according to a preset condition, whether a third WUS or a fourth WUS is sent in a basic unit; a third sending manner: determining, according to first signaling, whether the fourth WUS is sent in the basic unit or one of the third WUS or the fourth WUS is sent in the basic unit; or a fourth sending manner: determining, according to second signaling and a basic unit index, a fifth WUS sent in the basic unit.

Specifically, in order that the problem in which in the related art, all terminals in a PO are awakened when only some terminals need to be awakened is avoided, in this embodiment of the present disclosure, terminals in the same PO are grouped, each terminal group corresponds to one WUS, and this WUS is called a grouped WUS. The grouped WUS is sent so that the number of times terminals perform unnecessary detection of a PDCCH is reduced. The grouped WUS may be preset or may be configured through signaling according to a terminal that currently needs to be awakened. Of course, if the grouped WUS is sent all the time, in a scenario where all terminals need to be awakened, for example, a scenario where system change information is sent, the transmission of the grouped WUS causes additional resource overheads.

It is to be noted that in this embodiment of the present disclosure, the ungrouped WUS refers to a WUS corresponding to all terminals in the same PO; and the grouped WUS refers to a WUS corresponding to each terminal group when all terminals in the same PO are grouped.

In this embodiment of the present disclosure, the first sending manner is sending a first WUS in a first basic unit and sending a second WUS in a second basic unit.

In this embodiment of the present disclosure, the first WUS is an ungrouped WUS, and the second WUS is a grouped WUS. In the first sending manner, the first basic unit and/or the second basic unit is a basic unit indicated through signaling and/or a preset basic unit.

That is, in the first sending manner of this embodiment of the present disclosure, different WUSs are sent in different basic units so that a base station sends different WUSs in a switched manner.

It is to be noted that in this embodiment of the present disclosure, the ungrouped WUS refers to a WUS corresponding to all UEs in the same PO; and the grouped WUS refers to a WUS corresponding to each UE group when all UEs in the same PO are grouped.

The second sending manner is determining, according to a preset condition, whether a third WUS or a fourth WUS is sent in a basic unit.

In this embodiment of the present disclosure, in the second seconding manner, the preset condition includes at least one of: a terminal type, the length of a physical downlink control channel (PDCCH) search space, the length of a WUS search space, a WUS sending length or the number of groups.

In the case where the preset condition is the terminal type, determining, according to the preset condition, whether the third WUS or the fourth WUS is sent in the basic unit includes:

determining that the third WUS is sent in the basic unit in the case where W terminals among terminals corresponding to the basic unit have a coverage enhancement type, in the case where Z terminals among the terminals corresponding to the basic unit are in the coverage enhancement manner or in the case where the number of types of the terminals corresponding to the basic unit exceeds a preset number; otherwise, determining that the fourth WUS is sent in the basic unit. W and Z each are a positive integer greater than 1.

In the case where the preset condition is the length of the PDCCH search space, determining, according to the preset condition, whether the third WUS or the fourth WUS is sent in the basic unit includes: determining that the third WUS is sent in the basic unit in the case where the length of the PDCCH search space is greater than or equal to a first threshold; otherwise, determining that the fourth WUS is sent in the basic unit.

In the case where the preset condition is the length of the WUS search space, determining, according to the preset condition, whether the third WUS or the fourth WUS is sent in the basic unit includes: determining that the third WUS is sent in the basic unit in the case where the length of the WUS search space is greater than or equal to a second threshold; otherwise, determining that the fourth WUS is sent in the basic unit.

In the case where the preset condition is the WUS sending length, determining, according to the preset condition, whether the third WUS or the fourth WUS is sent in the basic unit includes: determining that the third WUS is sent in the basic unit in the case where the WUS sending length is greater than or equal to a third threshold; otherwise, the fourth WUS is sent in the basic unit.

In the case where the preset condition is the number of groups, determining, according to the preset condition, whether the third WUS or the fourth WUS is sent in the basic unit includes: determining that the third WUS is sent in the basic unit when the number of groups is the first number of groups and determining that the fourth WUS is sent in the basic unit when the number of groups is the second number of groups.

It is to be noted that in this embodiment of the present disclosure, in the second sending manner, it is feasible to configure only one preset condition or configure several preset conditions in a combined manner. In practical implementation, those skilled in the art may perform configuration according to actual requirements. This is not limited in this embodiment of the present disclosure.

In practical implementation, in this embodiment of the present disclosure, the third WUS is an ungrouped WUS, and the fourth WUS is a grouped WUS; or the third WUS and the fourth WUS each are a grouped WUS.

In the case where the third WUS is an ungrouped WUS and the fourth WUS is a grouped WUS, the time-domain length of the third WUS is greater than the time-domain length of the fourth WUS.

In the case where the third WUS and the fourth WUS each are a grouped WUS, a sequence corresponding to the third WUS is a first sequence, and a sequence corresponding to the fourth WUS is a second sequence. The first sequence corresponds to the first number of groups, and the second sequence corresponds to the second number of groups.

In this embodiment of the present disclosure, in the third sending manner, the first signaling includes first enable signaling.

In brief, a base station may send an ungrouped WUS when a grouped WUS is enabled.

In this embodiment of the present disclosure, in the fourth sending manner, the second signaling includes at least one of: the maximum number of groups corresponding to the fifth WUS, the minimum number of groups corresponding to the fifth WUS, the number of groups corresponding to the fifth WUS, or a change indication of the number of groups corresponding to the fifth WUS.

That is, in this embodiment of the present disclosure, all WUSs sent in the fourth sending manner are grouped WUSs.

For example, assuming that the basic unit of this embodiment of the present disclosure is a DRX cycle and the number of groups corresponding to a grouped WUS is set to 2 by using higher-layer signaling (the preset maximum number of groups is 8), then each fifth WUS sent by a base station in the first DRX cycle within the signaling enable period is a grouped WUS corresponding to a number 2 of groups, each fifth WUS sent by the base station in the second DRX cycle within the signaling enable period is a grouped WUS corresponding to a number 4 of groups, each fifth WUS sent by the base station in the third DRX cycle within the signaling enable period is a grouped WUS corresponding to a number 8 of groups, each fifth WUS sent by the base station in the fourth DRX cycle within the signaling enable period is a grouped WUS corresponding to the number 2 of groups, and so on.

It is to be noted that in this embodiment of the present disclosure, the basic unit is at least one of: M paging occasions (POs), N discontinuous reception (DRX) cycles, P enhanced discontinuous reception (eDRX) cycles or K radio frames. M, N, P and K each are a positive integer greater than 0.

A second embodiment of the present application provides a WUS sending method. In this embodiment, the WUS sending manner of a base station is described using several implementations.

The following describes a first sending manner of this embodiment of the present disclosure.

Implementation One

It is assumed that a basic unit is a DRX cycle, a first basic unit is the d-th of each D DRX cycles, and a second basic unit is a DRX cycle other than the first basic unit. It is assumed that in the T-th PO in the first basic unit, terminals are indexed as $y_{T1}$, $y_{T2}$, $y_{T3}$ and $y_{T4}$, that is, a total of 4 terminals are in the PO. It is assumed that in the Mth PO in the second basic unit, terminals are indexed as $y_{M1}$, $y_{M2}$ and $y_{M3}$ and a grouped WUS corresponds to the fixed number 2 of groups; based on this assumption, grouped $WUS_1$ corresponds to terminals indexed as $y_{M1}$ and $y_{M2}$ and grouped $WUS_2$ corresponds to a terminal indexed as $y_{M3}$. Grouped $WUS_1$ and grouped $WUS_2$ correspond to different sequences when sent. A base station determines a DRX cycle index according to a DRX cycle period and a radio frame index.

All WUSs sent by the base station in the first basic unit are ungrouped WUSs. For example, if any one of the terminals indexed as $y_{T1}$, $y_{T2}$, $y_{T3}$ and $y_{T4}$ in the T-th PO needs to be awakened, the base station sends ungrouped WUSs.

All WUSs sent by the base station in the second basic unit are grouped WUSs. A number of grouped WUSs is 2. Here the M-th PO in the (d−1)-th DRX cycle is used as an example. If any one of the terminals indexed as $y_{M1}$ and $y_{M2}$ in the Mth PO needs to be awakened, the base station sends grouped $WUS_1$. If the terminal indexed as $y_{M3}$ in the Mth PO needs to be awakened, the base station sends the grouped $WUS_2$. If only the terminal indexed as $y_{M3}$ in the Mth PO needs to be awakened, the base station sends only the grouped $WUS_2$.

Implementation Two

It is assumed that a basic unit is a DRX cycle. It is assumed that a first basic unit is configured through signaling: interval k; based on this assumption, the first basic unit is a DRX cycle whose DRX cycle index modulo k is equal to F. It is assumed that the second basic unit is a DRX cycle other than the first basic unit. F is a preset value. Preferably, when the value of F is 0, it is assumed that in the T-th PO in the first basic unit, terminals are indexed as $y_{T1}$, $y_{T2}$, $y_{T3}$ and $y_{T4}$, that is, a total of 4 terminals are in the PO. In this case, it is assumed that in the M-th PO in the second basic unit, terminals are indexed as $y_{M1}$, and $y_{M2}$ and a grouped WUS corresponds to the fixed number 2 of groups; based on this assumption, grouped $WUS_1$ corresponds to a terminal indexed as $y_{M1}$ and grouped $WUS_2$ corresponds to a terminal indexed as $y_{M2}$. Grouped $WUS_1$ and grouped $WUS_2$ correspond to different sequences when sent. A base station determines a DRX cycle index according to a DRX cycle period and a radio frame index.

All WUSs sent by the base station in the first basic unit are ungrouped WUSs. For example, if any one of the terminals indexed as $y_{T1}$, $y_{T2}$, $y_{T3}$ and $y_{T4}$ in the T-th PO in the first basic unit needs to be awakened, the base station sends ungrouped WUSs.

All WUSs sent by the base station in the second basic unit are grouped WUSs. Each grouped WUS corresponds to the number 2 of groups. Here the M-th PO is used as an example. If the terminal indexed as $y_{M1}$ in the Mth PO needs to be awakened, the base station sends the grouped $WUS_1$. If the terminal indexed as $y_{M2}$ in the Mth PO needs to be awakened, the base station sends the grouped $WUS_2$. If only the terminal indexed as $y_{M2}$ in the M-th PO needs to be awakened, the base station sends only the grouped $WUS_2$.

Implementation Three

It is assumed that a basic unit is a DRX cycle and that a first basic unit/second basic unit is configured through signaling: first basic unit enable indication. It is assumed that the first WUS enable indication contains H bits and that each bit corresponds to one DRX cycle; based on this assumption, a DRX cycle corresponding to a bit of 1 is the first basic unit and a DRX cycle corresponding to a bit of 0 is the second basic unit, or a DRX cycle corresponding to a bit of 0 is the first basic unit and a DRX cycle corresponding to a bit of 1 is the second basic unit. It is assumed that in the T-th PO in the first basic unit, terminals are indexed as $y_{T1}$, $y_{T2}$, $y_{T3}$ and $y_{T4}$, that is, a total of 4 terminals are in the PO. It is assumed that in the Mth PO in the second basic unit, terminals are indexed as $y_{M1}$, $y_{M2}$, $y_{M3}$ and $y_{M4}$ and a grouped WUS corresponds to the fixed number of groups: 2; based on this assumption, grouped $WUS_1$ corresponds to terminals indexed as $y_{M1}$ and $y_{M2}$ and grouped $WUS_2$ corresponds to terminals indexed as $y_{M3}$ and $y_{M4}$. Grouped $WUS_1$ and grouped $WUS_2$ correspond to different sequences when sent.

All WUSs sendt by the base station in the first basic unit are ungrouped WUSs. For example, if any one of the terminals indexed as $y_{T1}$, $y_{T2}$, $y_{T3}$ and $y_{T4}$ in the T-th PO in the first basic unit needs to be awakened, the base station sends ungrouped WUSs.

All WUSs sent by the base station in the second basic unit are second WUSs. Each second WUS corresponds to the number 2 of groups. Here the M-th PO is used as an example. If any one of the terminals indexed as $y_{M1}$ and $y_{M2}$ in the M-th PO needs to be awakened, the base station sends grouped $WUS_1$. If any one of the terminals indexed as $y_{M3}$ and $y_{M4}$ in the Mth PO needs to be awakened, the base station sends grouped $WUS_2$.

The preceding grouping of all terminals in the PO is only an example, and other grouping methods are not excluded.

The following describes a second sending manner of this embodiment of the present disclosure.

Implementation One

It is assumed that a basic unit is a PO and that the length of the PDCCH search space corresponding to the T-th PO is 1024. It is assumed that preset threshold 1 (that is, the first threshold described in embodiments of the present disclosure) is 1024. It is assumed that the setting WUS-Alpha=¼ is performed through signaling. Based on these assumptions, the length of a WUS search space is 1024×(¼)=256.

Since the length 1024 of the PDCCH search space is greater than or equal to threshold 1, a base station sends a third WUS. The third WUS is an ungrouped WUS. The time-domain length of the third WUS is the same as the length of the WUS search space, that is, 256.

Implementation Two

It is assumed that a basic unit is a PO and that the length of the PDCCH search space corresponding to the T-th PO is 512. It is assumed that preset threshold 1 is 1024. It is assumed that the setting WUS-Alpha=¼ is performed through signaling. Based on these assumptions, the length of a WUS search space is 512×(¼)=128.

Since the length 512 of the PDCCH search space is less than threshold 1, a base station sends a fourth WUS. The fourth WUS is a grouped WUS. The time-domain length of the fourth WUS is less than or equal to the length of the WUS search space.

Implementation Three

It is assumed that a basic unit is a PO and that the length of the PDCCH search space corresponding to the T-th PO is 1024. It is assumed that the setting WUS-Alpha=¼ is performed through signaling. Based on these assumptions, the length of a WUS search space is 1024×(¼)=256. It is assumed that preset threshold 2 is 128.

Since the length 256 of the WUS search space is greater than or equal to threshold 2 (that is, the second threshold described in embodiments of the present disclosure), a base station sends a third WUS. The third WUS is an ungrouped WUS. The time-domain length of the third WUS is the same as the length of the WUS search space, that is, 256.

Implementation Four

It is assumed that a basic unit is a PO and that the length of the PDCCH search space corresponding to the T-th PO is 512. It is assumed that the setting WUS-Alpha=¼ is performed through signaling. Based on these assumptions, the length of a WUS search space is 512×(¼)=128. It is assumed that preset threshold 2 is 256.

Since the length 128 of the WUS search space is less than threshold 2, a base station sends a fourth WUS. The fourth WUS is a grouped WUS. The time-domain length of the fourth WUS is less than or equal to the length of the WUS search space.

Implementation Five

It is assumed that a basic unit is a PO and that terminals in the T-th PO are indexed as $y_1$, $y_2$, $y_3$ and $y_4$. The terminal indexed as $y_4$ is in the coverage enhancement mode.

A base station sends a third WUS. The third WUS is an ungrouped WUS. The time-domain length of the third WUS is the same as the length of a WUS search space.

Implementation Six

It is assumed that a basic unit is a PO and that terminals in the T-th PO are indexed as $y_1$, $y_2$, $y_3$ and $y_4$. The terminal indexed as $y_4$ is in coverage enhancement terminal.

A base station sends a third WUS. The third WUS is an ungrouped WUS. The time-domain length of the third WUS is the same as the length of a WUS search space.

Implementation Seven

It is assumed that a basic unit is a PO and that terminals in the T-th PO are indexed as $y_1$, $y_2$, $y_3$ and $y_4$. None of the terminals is a coverage enhancement terminal or is in the coverage enhancement mode.

A base station sends a fourth WUS. The fourth WUS is a grouped WUS. The time-domain length of the fourth WUS is less than or equal to the length of a WUS search space.

Implementation Eight

It is assumed that a basic unit is a PO, the length of the PDCCH search space corresponding to the T-th PO is 1024, and the length of the PDCCH search space corresponding to the (T+1-)-th PO is 512. It is assumed that preset threshold 1 is 1024.

In the T-th PO, since the length 1024 of the PDCCH search space is greater than or equal to threshold 1, a base station sends a third WUS. The time-domain length of the third WUS is A1. In the (T+1)-th PO, since the length 512 of the PDCCH search space is less than threshold 1, the base station sends a fourth WUS. The time-domain length of the fourth WUS is A2, and A1>A2.

Implementation Nine

It is assumed that a basic unit is a PO, the length of the PDCCH search space corresponding to the T-th PO is 1024, and the length of the PDCCH search space corresponding to the (T+1)-th PO is 512. It is assumed that the setting WUS-Alpha=¼ is performed through signaling. It is assumed that preset threshold 2 is 128.

In the T-th PO, since the length 1024/4 of a WUS search space is greater than or equal to threshold 2, a base station sends a third WUS. The time-domain length of the third WUS is A3. In the (T+1)-th PO, since the length 512/4 of the WUS search space is less than threshold 2, the base station sends a fourth WUS. The time-domain length of the fourth WUS is A4, and A3>A4.

Implementation Ten

It is assumed that a basic unit is a PO and that the T-th PO corresponds to 4 terminals. Among the terminals, the terminal type of terminal A is R15, the terminal type of terminal B is R15, the terminal type of terminal C is R16, and the terminal type of terminal D is R16. Multiple terminal types are included. Therefore, a base station sends a third WUS. The third WUS is an ungrouped WUS. That is, if any one of terminal A, terminal B, terminal C or terminal D needs to be awakened, the base station sends third WUSs.

Implementation Eleven

It is assumed that a basic unit is a PO. A base station sends a third WUS or a fourth WUS according to the number of groups needed. When the number of groups is the first number of groups, a third WUS is sent. The third WUS is a grouped WUS. The third WUS corresponds to a sequence corresponding to the first number of groups. When the number of groups is the second number of groups, a fourth WUS is sent. The fourth WUS is a grouped WUS. The fourth WUS corresponds to a sequence corresponding to the second number of groups.

The following describes a third sending manner of this embodiment of the present disclosure.

It is assumed that first enable signaling is grouped WUS enable signaling. When the value corresponding to the grouped WUS enable signaling is 1, a grouped WUS is enabled; otherwise, a grouped WUS is not enabled.

Implementation One

Assuming that the value corresponding to the grouped WUS enable signaling is 1, a base station sends a fourth WUS. The fourth WUS is a grouped WUS.

Implementation Two

Assuming that the value corresponding to the grouped WUS enable signaling is 1, a base station sends a third WUS or a fourth WUS. The third WUS is an ungrouped WUS. The fourth WUS is a grouped WUS. For example, when system change indication information is to be sent, the base station sends the third WUS.

The following describes a fourth sending manner of this embodiment of the present disclosure.

Implementation One

It is assumed that a basic unit is a DRX cycle and that the number of groups corresponding to a grouped WUS is set to 2 by using higher-layer signaling. Assuming that in the T-th PO in the DRX cycle, terminals are indexed as $y_{T1}$, $y_{T2}$, $y_{T3}$ and $y_{T4}$, that is, a total of 4 terminals are in the PO, then grouped $WUS_{T1}$ corresponds to terminals indexed as $y_{T1}$ and $y_{T2}$ and grouped $WUS_{T2}$ corresponds to terminals indexed as $y_{T3}$ and $y_{T4}$. Grouped $WUS_{T1}$ and grouped $WUS_{T2}$ correspond to different sequences when sent. Assuming that in the G-th PO in the DRX cycle, terminals are indexed as $y_{G1}$, $y_{G2}$, $y_{G3}$ and $y_{G4}$, that is, a total of 4 terminals are in the PO, then grouped $WUS_{G1}$ corresponds to terminals indexed as $y_{G1}$ and $y_{G2}$ and grouped $WUS_{G2}$ corresponds to terminals indexed as $y_{G3}$ and $y_{G4}$. Grouped $WUS_{G1}$ and grouped $WUS_{G2}$ correspond to different time-domain positions when sent.

All WUSs sent in the DRX cycle during the base station higher-layer signaling are fifth WUSs. Each fifth WUS corresponds to the number 2 of groups. That is, in the T-th PO, if any one of the terminals indexed as $y_{T1}$ and $y_{T2}$ needs to be awakened, a base station sends grouped $WUS_{T1}$, and if any one of the terminals indexed as $y_{T3}$ and $y_{T4}$ needs to be awakened, the base station sends grouped $WUS_{T2}$; in the G-th PO, if any one of the terminals indexed as $y_{G1}$ and $y_{G2}$ needs to be awakened, the base station sends grouped $WUS_{G1}$, and if any one of the terminals indexed as $y_{G3}$ and $y_{G4}$ needs to be awakened, the base station sends grouped $WUS_{G2}$.

Implementation Two

Assuming that a basic unit is a DRX cycle and the number of groups corresponding to a grouped WUS is set to 2 by using higher-layer signaling (the preset maximum number of groups is 8), then each fifth WUS sent by a base station in the first DRX cycle is a grouped WUS corresponding to the number 2 of groups, each fifth WUS sent by the base station in the second DRX cycle is a grouped WUS corresponding to the number 4 of groups, each fifth WUS sent by the base station in the third DRX cycle is a grouped WUS corresponding to the number 8 of groups, each fifth WUS sent by the base station in the fourth DRX cycle is a grouped WUS corresponding to the number 2 of group, and so on.

Implementation Three

Assuming that a basic unit is a DRX cycle and the maximum number of groups corresponding to a grouped WUS is set to 8 by using higher-layer signaling (the preset minimum number of groups is 2), then each fifth WUS sent by a base station in the first DRX cycle is a grouped WUS corresponding to the number of groups: 8, each fifth WUS sent by the base station in the second DRX cycle is a grouped WUS corresponding to the number of groups: 4, each fifth WUS sent by the base station in the third DRX cycle is a grouped WUS corresponding to the number of groups: 2, each fifth WUS sent by the base station in the fourth DRX cycle is a grouped WUS corresponding to the number of groups: 8, and so on.

Implementation Four

It is assumed that a basic unit is a DRX cycle. It is assumed that the predefined number of groups is {2, 4}. It is assumed that a change indication of the number of groups that is configured through signaling is a WUS change interval about the number of groups. It is assumed that each WUS change interval is 2 DRX cycles. A base station determines a DRX cycle index according to a DRX cycle period and a radio frame index and determines the position of each WUS change interval according to the DRX cycle index.

Each WUS sent in the 2 DRX cycles (assumed to be the first DRX cycle and the second DRX cycle) of the first WUS change interval is a grouped WUS corresponding to the number 2 of group.

Each WUS sent in the 2 DRX cycles (assumed to be the third DRX cycle and the fourth DRX cycle) of the second WUS change interval is a grouped WUS corresponding to the number 4 of groups.

Each WUS sent in the 2 DRX cycles (assumed to be the fifth DRX cycle and the sixth DRX cycle) of the third WUS change interval is a grouped WUS corresponding to the number 2 of groups.

Each WUS sent in the 2 DRX cycles (assumed to be the seventh DRX cycle and the eighth DRX cycle) of the fourth WUS change interval is a grouped WUS corresponding to the number 4 of groups. The rest is done in the same manner.

Assuming that the first DRX cycle is a DRX cycle whose DRX cycle index is 0, then the second DRX cycle is a DRX cycle whose DRX cycle index is 1, the third DRX cycle is a DRX cycle whose DRX cycle index is 2, the fourth DRX cycle is a DRX cycle whose DRX cycle index is 3, and so on.

A third embodiment of the present application provides a wake-up signal (WUS) detection method. Referring to FIG. 2, the method includes S201 and S202.

In S201, a WUS is received.

In S202, the WUS is detected by using at least one of a first detection manner, a second detection manner, a third detection manner or a fourth detection manner.

In the first detection manner, detection is performed in a first basic unit according to a first WUS and is performed in a second basic unit according to a second WUS.

In the second detection manner, it is determined, according to a preset condition, whether detection is performed in a basic unit according to a third WUS, according to a fourth WUS or according to the third WUS and the fourth WUS.

In the third detection manner, it is determined, according to first signaling, whether detection is performed in the basic unit according to the fourth WUS or according to the third WUS and the fourth WUS.

In the fourth detection manner, it is determined, according to second signaling, that detection is performed in the basic unit according to a fifth WUS.

In general, a terminal of this embodiment of the present disclosure detects the received WUS according to a transmission rule predetermined with a base station, thereby determining whether to detect a PDCCH.

It is to be noted that in this embodiment of the present disclosure, the first WUS is an ungrouped WUS, and the second WUS is a grouped WUS; the third WUS and the fourth WUS are an ungrouped WUS and a grouped WUS respectively or are each a grouped WUS; the fifth WUS is a grouped WUS.

In this embodiment of the present disclosure, the ungrouped WUS refers to a WUS corresponding to a PO where a terminal is located; and the grouped WUS refers to a WUS corresponding to a group where a terminal is located.

In this embodiment of the present disclosure, in the case where the third WUS is an ungrouped WUS and the fourth WUS is a grouped WUS, the time-domain length of the third WUS is greater than the time-domain length of the fourth WUS.

In this embodiment of the present disclosure, in the case where the third WUS and the fourth WUS are each a grouped WUS, a sequence corresponding to the third WUS is a first sequence, and a sequence corresponding to the fourth WUS is a second sequence. The first sequence corresponds to the first number of groups, and the second sequence corresponds to the second number of groups.

In the first detection manner, the first basic unit and/or the second basic unit is a basic unit indicated through signaling and/or a preset basic unit.

For example, in practical implementation, in this embodiment of the present disclosure, the terminal may obtain a DRX cycle index according to a radio frame index and a DRX cycle period and determine the preset basic unit in the first detection manner according to the DRX cycle index.

In this embodiment of the present disclosure, in the second detection manner, the preset condition includes at least one of the length of a PDCCH search space or the length of a WUS search space.

In the case where the preset condition is the length of the PDCCH search space, determining, according to the preset condition, whether detection is performed in the basic unit according to the third WUS or according to the fourth WUS includes performing detection according to the third WUS in the case where the length of the PDCCH search space is greater than or equal to a first threshold; otherwise, performing detection according to the fourth WUS. In the case where the preset condition is the length of the WUS search space, determining, according to the preset condition, whether detection is performed in the basic unit according to the third WUS or according to the fourth WUS includes performing detection according to the third WUS in the case where the length of the WUS search space is greater than or equal to a second threshold; otherwise, performing detection according to the fourth WUS.

In this embodiment of the present disclosure, in the third detection manner, the first signaling is first enable signaling.

That is, the terminal determines a detection manner according to grouped WUS enable signaling.

In this embodiment of the present disclosure, in the fourth detection manner, the second signaling includes at least one of: the maximum number of groups corresponding to the fifth WUS, the minimum number of groups corresponding to the fifth WUS, the number of groups corresponding to the fifth WUS, or a change interval of the number of groups corresponding to the fifth WUS.

That is, in this embodiment of the present disclosure, all WUSs received in the fourth detection manner are grouped WUSs.

It is to be noted that in this embodiment of the present disclosure, the basic unit is at least one of: M paging occasions (POs), N discontinuous reception (DRX) cycles, P enhanced discontinuous reception (eDRX) cycles or K radio frames. M, N, P and K are each a positive integer greater than 0.

A fourth embodiment of the present application provides a WUS detection method. In this embodiment, the method is described using several implementations.

The following describes a first detection manner of this embodiment of the present disclosure.

Implementation One

It is assumed that a basic unit is a DRX cycle, a first basic unit is the d-th of each D DRX cycles (a terminal may obtain a DRX cycle index according to a radio frame index and a DRX cycle period), and a second basic unit is a basic unit other than the first basic unit. It is assumed that in the T-th PO in the DRX cycle, terminals are indexed as $y_1$, $y_2$, $y_3$ and $y_4$, that is, a total of 4 terminals are in the PO. It is assumed that a grouped WUS corresponds to the fixed number 2 of groups; based on this assumption, grouped $WUS_1$ corresponds to terminals indexed as $y_1$ and $y_2$ and grouped $WUS_2$ corresponds to terminals indexed as $y_3$ and $y_4$. Grouped $WUS_1$ and grouped $WUS_2$ correspond to different time-domain positions.

The terminal performs detection in a PO in the first basic unit according to an ungrouped WUS.

The terminal performs detection in a PO in the second basic unit according to a grouped WUS. Here the T-th PO is used as an example. The terminals indexed as $y_1$ and $y_2$ perform detection, according to grouped $WUS_1$, in the time-domain position corresponding to grouped $WUS_1$. The terminals indexed as $y_3$ and $y_4$ perform detection, according to grouped $WUS_2$, in the time-domain position corresponding to grouped $WUS_2$. The terminal determines the detection of the corresponding PDCCH according to the detection result of the WUS.

Implementation Two

It is assumed that a basic unit is a DRX cycle. It is assumed that a first basic unit is obtained through signaling: interval k; based on this assumption, the first basic unit is a DRX cycle whose DRX cycle index modulo k is equal to F. It is assumed that the second basic unit is a DRX cycle other than the first basic unit. F is a preset value. Preferably, when the value of F is 0, it is assumed that in the T-th PO, terminals are indexed as $y_1$, $y_2$, $y_3$ and $y_4$, that is, a total of 4 terminals are in the PO. In this case, it is assumed that a grouped WUS corresponds to the fixed number 2 of groups; based on this assumption, grouped $WUS_1$ corresponds to terminals indexed as $y_1$ and $y_2$ and grouped $WUS_2$ corresponds to terminals indexed as $y_3$ and $y_4$. Grouped $WUS_1$ and grouped $WUS_2$ correspond to different time-domain positions.

A terminal performs detection in a PO in the first basic unit according to an ungrouped WUS.

The terminal performs detection in a PO in the second basic unit according to a grouped WUS. Here the T-th PO is used as an example. The terminals indexed as $y_1$ and $y_2$ perform detection according to grouped $WUS_1$. The terminals indexed as $y_3$ and $y_4$ perform detection according to grouped $WUS_2$. The terminal determines the detection of the corresponding PDCCH according to the detection result of the WUS.

Implementation Three

It is assumed that a basic unit is a DRX cycle and that a first basic unit and a second basic unit are configured through signaling: first basic unit indication. It is assumed that the first basic unit indication contains H bits and that each bit corresponds to one DRX cycle; based on this assumption, a DRX cycle corresponding to a bit of 1 is the first basic unit and a DRX cycle corresponding to a bit of 0 is the second basic unit, or a DRX cycle corresponding to a bit of 0 is the first basic unit and a DRX cycle corresponding to a bit of 1 is the second basic unit.

A terminal may implicitly obtain a DRX cycle index according to a radio frame index and a DRX cycle period. The terminal performs detection in the corresponding PO in the first basic unit according to grouped $WUS_1$. The terminal performs detection in the corresponding PO in the second basic unit according to grouped $WUS_2$. The terminal determines the detection of the corresponding PDCCH according to the detection result of the WUS.

The following describes a second detection manner of this embodiment of the present disclosure.

Implementation One

It is assumed that a terminal detects, according to rule 1, a third WUS or a fourth WUS received in a basic unit. It is assumed that the basic unit is a PO and that the length of a PDCCH search space is 1024. It is assumed that preset threshold 1 is 1024. It is assumed that the setting WUS-Alpha=¼ is performed. Based on these assumptions, the length of a WUS search space is 1024×(¼)=256.

Since the length of the PDCCH search space is greater than or equal to threshold 1, the terminal performs detection according to the third WUS. The length of the detected WUS is equal to 256. The terminal determines the detection of the corresponding PDCCH according to the detection result of the WUS.

Implementation Two

It is assumed that a terminal detects, according to rule 1, a third WUS or a fourth WUS received in a basic unit. It is assumed that the basic unit is a PO and that the length of a PDCCH search space is 512. It is assumed that threshold 1 is set to 1024 through signaling. It is assumed that the setting WUS-Alpha=¼ is performed. Based on these assumptions, the length of a WUS search space is 512×(¼)=128. It is assumed that the number of groups is set to 2.

Since the length of the PDCCH search space is less than threshold 1, the terminal performs detection according to the fourth WUS. The fourth WUS is a grouped WUS. The terminal determines the detection of the corresponding PDCCH according to the detection result of the WUS.

Implementation Three

It is assumed that a terminal detects, according to rule 1, a third WUS or a fourth WUS received in a basic unit. It is assumed that the basic unit is a PO and that the length of a PDCCH search space is 1024. It is assumed that the setting WUS-Alpha=¼ is performed. Based on these assumptions, the length of a WUS search space is 1024×(¼)=256. It is assumed that preset threshold 2 is 128. It is assumed that the number of groups is set to 2. It is assumed that the grouped WUS corresponding to terminal A is grouped $WUS_1$.

Since the length 256 of the WUS search space is greater than or equal to threshold 2, terminal A performs detection according to the third WUS. The length of the detected WUS is equal to 256. Terminal A performs detection according to grouped $WUS_1$. The terminal determines the detection of the corresponding PDCCH according to the detection result of the WUS.

Implementation Four

It is assumed that a terminal detects, according to rule 1, a third WUS or a fourth WUS received in a basic unit. It is assumed that the basic unit is a PO and that the length of a PDCCH search space is 512. It is assumed that the setting WUS-Alpha=¼ is performed. Based on these assumptions, the length of a WUS search space is 1024×(¼)=128. It is assumed that preset threshold 2 is 128. It is assumed that the grouped WUS corresponding to terminal A is grouped $WUS_1$.

Since the length 128 of the WUS search space is less than threshold 2, terminal A performs detection according to the fourth WUS. The fourth WUS is a grouped WUS. Terminal A performs detection according to grouped $WUS_1$. The terminal determines the detection of the corresponding PDCCH according to the detection result of the WUS.

Implementation Five

It is assumed that a terminal performs detection according to a third WUS and a fourth WUS. It is assumed that the basic unit is a PO.

The terminal performs detection according to the third WUS. The terminal performs detection according to an ungrouped WUS. When the terminal detects that the PO corresponds to the fourth WUS, the terminal performs detection according to a grouped WUS. The time-domain length corresponding to the third WUS is greater than the time-domain length corresponding to the fourth WUS. If either of the third WUS or the fourth WUS is detected, the terminal detects a PDCCH. If neither the third WUS nor the fourth WUS is detected, the terminal does detect a PDCCH. The ungrouped WUS and the grouped WUS are located in different time-domain positions or correspond to different sequences.

Implementation Six

It is assumed that a terminal performs detection according to a third WUS and a fourth WUS. It is assumed that the basic unit is a PO.

When the terminal performs detection according to the third WUS, the terminal performs detection according to a grouped WUS, that is, the detection sequence corresponds to the first number of groups. When the terminal performs detection according to the fourth WUS, the terminal performs detection according to a grouped WUS, that is, the detection sequence corresponds to the second number of groups. If either of the third WUS or the fourth WUS is detected, the terminal detects a PDCCH. If neither the third WUS nor the fourth WUS is detected, the terminal does not detect a PDCCH. The ungrouped WUS and the grouped WUS are located in different time-domain positions or correspond to different sequences.

The following describes a third detection manner of this embodiment of the present disclosure.

It is assumed that when the value corresponding to grouped WUS enable signaling is 1, a grouped WUS is enabled; otherwise, a grouped WUS is not enabled.

Implementation One

Assuming that a terminal obtains, according to higher-layer signaling, that the value corresponding to grouped WUS enable signaling is 1, the terminal performs detection according to a third WUS and a fourth WUS. If neither the third WUS nor the fourth WUS is detected, the terminal does not detect a PDCCH. If either of the third WUS or the fourth WUS is detected, the terminal detects a PDCCH.

Implementation Two

Assuming that a terminal obtains, according to higher-layer signaling, that the value corresponding to grouped WUS enable signaling is 1, the terminal performs detection according to a third WUS and a fourth WUS. The third WUS is an ungrouped WUS. The fourth WUS is a grouped WUS. For example, when system change indication information is to be sent, a base station sends the third WUS.

The following describes a fourth detection manner of this embodiment of the present disclosure.

Implementation One

It is assumed that a basic unit is a DRX cycle and that the number of groups corresponding to a grouped WUS is set to 4 by using higher-layer signaling. Assuming that in the T-th PO in the DRX cycle, terminals are indexed as $y_1, y_2, y_3$ and $y_4$, that is, a total of 4 terminals are in the PO, then grouped $WUS_1$ corresponds to a terminal indexed as $y_1$, grouped $WUS_2$ corresponds to a terminal indexed as $y_2$, grouped $WUS_3$ corresponds to a terminal indexed as $y_3$, and grouped $WUS_4$ corresponds to a terminal indexed as $y_4$.

The terminal indexed as $y_1$ performs detection according to grouped $WUS_1$. The terminal indexed as $y_2$ performs detection according to grouped $WUS_2$. The terminal indexed as $y_3$ performs detection according to grouped $WUS_3$. The terminal indexed as $y_4$ performs detection according to grouped $WUS_4$. A terminal determines the detection of a PDCCH according to the detection result of the WUS.

Implementation Two

It is assumed that a basic unit is a DRX cycle and that the number of groups corresponding to a grouped WUS is set to 2 by using higher-layer signaling. It is assumed that in the T-th PO in the DRX cycle, terminals are indexed as $y_1, y_2, y_3$ and $y_4$, that is, a total of 4 terminals are in the PO. It is assumed that grouped $WUS_1$ corresponds to terminals indexed as $y_1$ and $y_2$, and grouped $WUS_2$ corresponds to terminals indexed as $y_3$ and $y_4$.

The terminals indexed as $y_1$ and $y_2$ perform detection according to grouped $WUS_1$. The terminals indexed as $y_3$ and $y_4$ perform detection according to grouped $WUS_2$. A terminal determines the detection of a PDCCH according to the detection result of the WUS.

Implementation Three

It is assumed that a basic unit is a DRX cycle and that the number of groups corresponding to a grouped WUS is set to 1 by using higher-layer signaling. It is assumed that in the T-th PO in the DRX cycle, terminals are indexed as $y_1, y_2, y_3$ and $y_4$, that is, a total of 4 terminals are in the PO.

It is assumed that grouped $WUS_1$ corresponds to terminals indexed as $y_1, y_2, y_3$ and $y_4$.

The terminals indexed as $y_1, y_2, y_3$ and $y_4$ perform detection according to grouped $WUS_1$. A terminal determines the detection of a PDCCH according to the detection result of the WUS.

Implementation Four

It is assumed that a basic unit is a DRX cycle and that the number of groups corresponding to a grouped WUS is set to 1 by using higher-layer signaling. It is assumed that in the T-th PO in the DRX cycle, terminals are indexed as $y_1, y_2, y_3$ and $y_4$, that is, a total of 4 terminals are in the PO.

Since the number of groups is set to 1, the terminals indexed as $y_1, y_2, y_3$ and $y_4$ perform detection according to a WUS. The WUS is a WUS in the related art. A terminal determines the detection of a PDCCH according to the detection result of the WUS.

Implementation Five

It is assumed that a basic unit is a DRX cycle and the maximum number of groups corresponding to a grouped WUS is set to 8 by using higher-layer signaling. It is assumed that in the T-th PO in each DRX cycle, terminals are indexed as $y_1, \ldots, y_{16}$, that is, a total of 16 terminals are in the PO. It is assumed that the terminal indexed as $y_8$ corresponds to $WUS_4$ in response to the number 8 of groups, corresponds to $WUS_2$ in response to the number of groups is 4, and corresponds to $WUS_1$ when the number of groups is 2.

In the i-th DRX cycle, the number of groups is 8, and the terminal indexed as $y_8$ performs detection in the corresponding PO according to grouped $WUS_4$; the terminal determines the detection of a PDCCH according to the detection result of the WUS.

In the (i+1)-th DRX cycle, the number of groups is 4, and the terminal indexed as $y_8$ performs detection in the corresponding PO according to grouped $WUS_2$; the terminal determines the detection of a PDCCH according to the detection result of the WUS.

In the (i+2)-th DRX cycle, the number of groups is 2, and the terminal indexed as $y_8$ performs detection in the corresponding PO according to grouped $WUS_1$; the terminal determines the detection of a PDCCH according to the detection result of the WUS.

In the (i+3)-th DRX cycle, the number of groups is 8, and the terminal indexed as $y_8$ performs detection in the corresponding PO according to grouped $WUS_4$; the terminal determines the detection of a PDCCH according to the detection result of the WUS.

In the (i+4)-th DRX cycle, the number of groups is 4, and the terminal indexed as $y_8$ performs detection in the corresponding PO according to grouped $WUS_2$; the terminal determines the detection of a PDCCH according to the detection result of the WUS.

In the (i+5)-th DRX cycle, the number of groups is 2, and the terminal indexed as $y_8$ performs detection in the corresponding PO according to grouped $WUS_1$; the terminal determines the detection of a PDCCH according to the detection result of the WUS. The rest is done in the same manner.

Implementation Six

It is assumed that a basic unit is a DRX cycle and the number of groups corresponding to a grouped WUS is set to 2 by using higher-layer signaling. It is assumed that in the T-th PO in each DRX cycle, terminals are indexed as $y_1, \ldots, y_{16}$, that is, a total of 16 terminals are in the PO. It is assumed that the terminal indexed as $y_8$ corresponds to $WUS_4$ in response to the number 8 of groups corresponds to $WUS_2$ in response to the number 4 of groups, and corresponds to $WUS_1$ when the number of groups is 2.

In the i-th DRX cycle, the number of groups is 2, and the terminal indexed as $y_8$ performs detection in the corresponding PO according to grouped $WUS_1$; the terminal determines the detection of a PDCCH according to the detection result of the WUS.

In the (i+1)-th DRX cycle, the number of groups is 4, and the terminal indexed as $y_8$ performs detection in the corresponding PO according to grouped $WUS_2$; the terminal determines the detection of a PDCCH according to the detection result of the WUS.

In the (i+2)-th DRX cycle, the number of groups is 8, and the terminal indexed as $y_8$ performs detection in the corresponding PO according to grouped $WUS_4$; the terminal determines the detection of a PDCCH according to the detection result of the WUS.

In the (i+3)-th DRX cycle, the number of groups is 2, and the terminal indexed as $y_8$ performs detection in the corresponding PO according to grouped $WUS_1$; the terminal determines the detection of a PDCCH according to the detection result of the WUS.

In the (i+4)-th DRX cycle, the number of groups is 4, and the terminal indexed as $y_8$ performs detection in the corresponding PO according to grouped $WUS_2$; the terminal determines the detection of a PDCCH according to the detection result of the WUS.

In the (i+5)-th DRX cycle, the number of groups is 8, and the terminal indexed as $y_8$ performs detection in the corresponding PO according to grouped $WUS_4$; the terminal determines the detection of a PDCCH according to the detection result of the WUS. The rest is done in the same manner.

Implementation Seven

It is assumed that a basic unit is a DRX cycle. It is assumed that the predefined number of groups is {2, 4}. It is assumed that a WUS change interval about the number of groups is set to 2 DRX cycles through signaling. It is assumed that in the T-th PO in the DRX cycle, terminals are indexed as $y_1, y_2, y_3$ and $y_4$. If the number of groups is 2, grouped $WUS_1$ corresponds to terminals indexed as $y_1$ and $y_2$, and grouped $WUS_2$ corresponds to terminals indexed as $y_3$ and $y_4$. If the number of groups is 4, grouped $WUS_1$ corresponds to a terminal indexed as $y_1$, grouped $WUS_2$ corresponds to a terminal indexed as $y_2$, grouped $WUS_3$ corresponds to a terminal indexed as $y_3$, and grouped $WUS_4$ corresponds to a terminal indexed as $y_4$. A terminal determines a DRX cycle index according to a radio frame index and a DRX cycle period and determines a WUS change interval index according to the DRX cycle index. It is assumed that the first WUS change interval is DRX cycle index 0 and DRX cycle index 1, the second WUS change interval is DRX cycle index 2 and DRX cycle index 3, and so on.

The terminal indexed as $y_1$ performs detection, according to grouped $WUS_1$, in the corresponding PO in the 2 DRX cycles of the first WUS change interval. The terminal indexed as $y_1$ performs detection, according to grouped $WUS_1$, in the corresponding PO in the 2 DRX cycles of the second WUS change interval. The terminal determines the detection of a PDCCH according to the detection result of the WUS.

The terminal indexed as $y_2$ performs detection, according to grouped $WUS_1$, in the corresponding PO in the 2 DRX cycles of the first WUS change interval. The terminal indexed as $y_2$ performs detection, according to grouped $WUS_2$, in the corresponding PO in the 2 DRX cycles of the second WUS change interval. The terminal determines the detection of a PDCCH according to the detection result of the WUS.

The terminal indexed as $y_3$ performs detection, according to grouped $WUS_2$, in the corresponding PO in the 2 DRX cycles of the first WUS change interval. The terminal indexed as $y_3$ performs detection, according to grouped $WUS_3$, in the corresponding PO in the 2 DRX cycles of the second WUS change interval. The terminal determines the detection of a PDCCH according to the detection result of the WUS.

The terminal indexed as $y_4$ performs detection, according to grouped $WUS_2$, in the corresponding PO in the 2 DRX cycles of the first WUS change interval. The terminal indexed as $y_4$ performs detection, according to grouped $WUS_4$, in the corresponding PO in the 2 DRX cycles of the second WUS change interval. The terminal determines the detection of a PDCCH according to the detection result of the WUS.

Implementation Eight

It is assumed that a basic unit is a DRX cycle. It is assumed that the predefined number of groups is {2, 4} and {4, 8}. It is assumed that a WUS change interval about the number of groups is set to 2 DRX cycles through signaling. It is assumed that in the T-th PO in the DRX cycle, terminals are indexed as $y_1, y_2, y_3, y_4, y_5, y_6, y_7$ and $y_8$. If the number of groups is 2, it is assumed that grouped $WUS_1$ corresponds to terminals indexed as $y_1$, $y_2$, $y_3$ and $y_4$, and grouped $WUS_2$ corresponds to terminals indexed as $y_5$, $y_6$, $y_7$ and $y_8$. If the number of groups is 4, it is assumed that grouped $WUS_1$ corresponds to terminals indexed as $y_1$ and $y_2$, grouped $WUS_2$ corresponds to terminals indexed as $y_3$ and $y_4$, grouped $WUS_3$ corresponds to terminals indexed as $y_8$ and $y_6$, and grouped $WUS_4$ corresponds to terminals indexed as $y_7$ and $y_8$. If the number of groups is 8, it is assumed that grouped $WUS_1$ corresponds to a terminal indexed as $y_1$, grouped $WUS_2$ corresponds to a terminal indexed as $y_2$, grouped $WUS_3$ corresponds to a terminal indexed as $y_3$, grouped $WUS_4$ corresponds to a terminal indexed as $y_4$, grouped $WUS_5$ corresponds to a terminal indexed as $y_5$, grouped $WUS_6$ corresponds to a terminal indexed as $y_6$, grouped $WUS_7$ corresponds to a terminal indexed as $y_7$, and grouped $WUS_8$ corresponds to a terminal indexed as $y_8$. It is assumed that the configured paging parameter nB is T (the parameter value set of nB is {4T, 2T, T, T/2, T/4, T/8, T/16, T/32, T/64, T/128, and T/256, and for NB-IoT also T/512, and T/1024}).

A terminal determines the predefined number of groups according to the value of nB (that is, a set is defined for the predefined number of groups, and the predefined number of groups is determined according to the value of nB). Since nB≥T, the predefined number of groups is {2, 4}.

The terminal determines a DRX cycle index according to a radio frame index and a DRX cycle period and determines a WUS change interval index according to the DRX cycle index. It is assumed that the first WUS change interval is DRX cycle index 0 and DRX cycle index 1, the second WUS change interval is DRX cycle index 2 and DRX cycle index 3, and so on.

The terminal indexed as $y_1$ performs detection, according to grouped $WUS_1$, in the corresponding PO in the 2 DRX cycles (assumed to be the i-th DRX cycle and the (i+1)-th DRX cycle) of the first WUS change interval. The terminal indexed as $y_1$ performs detection, according to grouped $WUS_1$, in the corresponding PO in the 2 DRX cycles (assumed to be the (i+2)-th DRX cycle and the (i+3)-th DRX cycle) of the second WUS change interval. The terminal determines the detection of a PDCCH according to the detection result of the WUS.

The terminal indexed as $y_2$ performs detection, according to grouped $WUS_1$, in the corresponding PO in the 2 DRX cycles of the first WUS change interval. The terminal indexed as $y_2$ performs detection, according to grouped $WUS_1$, in the corresponding PO in the 2 DRX cycles of the second WUS change interval. The terminal determines the detection of a PDCCH according to the detection result of the WUS.

The terminal indexed as $y_3$ performs detection, according to grouped $WUS_1$, in the corresponding PO in the 2 DRX cycles of the first WUS change interval. The terminal indexed as $y_3$ performs detection, according to grouped $WUS_2$, in the corresponding PO in the 2 DRX cycles of the second WUS change interval. The terminal determines the detection of a PDCCH according to the detection result of the WUS.

The terminal indexed as $y_5$ performs detection, according to grouped $WUS_1$, in the corresponding PO in the 2 DRX cycles of the first WUS change interval. The terminal indexed as $y_5$ performs detection, according to grouped $WUS_2$, in the corresponding PO in the 2 DRX cycles of the second WUS change interval. The terminal determines the detection of a PDCCH according to the detection result of the WUS.

The terminal indexed as $y_5$ performs detection, according to grouped $WUS_2$, in the corresponding PO in the 2 DRX cycles of the first WUS change interval. The terminal indexed as $y_5$ performs detection, according to grouped $WUS_3$, in the corresponding PO in the 2 DRX cycles of the second WUS change interval. The terminal determines the detection of a PDCCH according to the detection result of the WUS.

The terminal indexed as $y_6$ performs detection, according to grouped $WUS_2$, in the corresponding PO in the 2 DRX cycles of the first WUS change interval. The terminal indexed as $y_6$ performs detection, according to grouped $WUS_3$, in the corresponding PO in the 2 DRX cycles of the second WUS change interval. The terminal determines the detection of a PDCCH according to the detection result of the WUS.

The terminal indexed as $y_7$ performs detection, according to grouped $WUS_2$, in the corresponding PO in the 2 DRX cycles of the first WUS change interval. The terminal indexed as $y_7$ performs detection, according to grouped $WUS_4$, in the corresponding PO in the 2 DRX cycles of the second WUS change interval. The terminal determines the detection of a PDCCH according to the detection result of the WUS.

The terminal indexed as $y_8$ performs detection, according to grouped $WUS_2$, in the corresponding PO in the 2 DRX cycles of the first WUS change interval. The terminal indexed as $y_8$ performs detection, according to grouped $WUS_4$, in the corresponding PO in the 2 DRX cycles of the second WUS change interval. The terminal determines the detection of a PDCCH according to the detection result of the WUS.

In this embodiment, for example, terminals in the PO in the DRX cycle are the same.

In this embodiment, the common manner in which a terminal detects a WUS is that the terminal performs related detection of a received WUS according to a generated WUS; if an energy peak is detected, the terminal considers that the WUS is detected; otherwise, the terminal considers that no WUS is detected. Other detection schemes are not excluded.

A fifth embodiment of the present application provides a wake-up signal (WUS) sending apparatus. Referring to FIG. 3, the apparatus includes a sending unit 31. The sending unit 31 is configured to send a WUS by using at least one of a first sending manner: sending a first WUS in a first basic unit and sending a second WUS in a second basic unit; a second sending manner: determining, according to a preset condition, whether a third WUS or a fourth WUS is sent in a basic unit; a third sending manner: determining, according to first signaling, whether the fourth WUS is sent in the basic unit or one of the third WUS or the fourth WUS is sent in the basic unit; or a fourth sending manner: determining, according to second signaling and a basic unit index, a fifth WUS sent.

In this embodiment of the present disclosure, the sending unit 31 sending a WUS to only a terminal that needs to be awakened. In this manner, the following problem is effectively solved: In the related art, sent WUSs awaken all terminals in a PO; as a result, a terminal that does not need to be awakened also has to detect a PDCCH, limiting the effect of power loss reduction of the terminal.

Specifically, in this embodiment of the present disclosure, the sending unit 31 sends, according to the to-be-awakened terminal, WUSs to all terminals in the group corresponding to the to-be-awakened terminal or to all terminals in one PO corresponding to the to-be-awakened terminal.

That is, in this embodiment of the present disclosure, all terminals in the same PO are grouped in advance, and WUSs are sent to the group where the to-be-awakened terminal is located so that WUSs are sent to only terminals that need to be awakened. In this manner, the following problem is effectively solved: In the related art, sent WUSs awaken all terminals in a PO; as a result, a terminal that does not need to be awakened also has to detect a PDCCH, and the effect of power loss reduction of the terminal is thus not apparent.

Specifically, in order that the problem in which in the related art, all terminals in a PO are awakened when only some terminals need to be awakened is avoided, in this embodiment of the present disclosure, terminals in the same PO are grouped. A group obtained from the grouping may be preset or may be configured through signaling according to a terminal that currently needs to be awakened. WUSs are sent to terminals in the group. In this manner, the following problem is avoided: A terminal that does not need to be awakened also has to detect a PDCCH, and the effect of power loss reduction of the terminal is thus not apparent.

It is to be noted that in this embodiment of the present disclosure, the ungrouped WUS refers to a WUS corresponding to all terminals in the same PO; and the grouped WUS refers to a WUS corresponding to each terminal group when all terminals in the same PO are grouped.

It is to be noted that the number of groups described in this embodiment of the present disclosure may be set for each PO separately or may be set to the same value for POs in a certain time period or for all POs.

In this embodiment of the present disclosure, the first sending manner is sending a first WUS in a first basic unit and sending a second WUS in a second basic unit.

In this embodiment of the present disclosure, the first WUS is an ungrouped WUS, and the second WUS is a grouped WUS. In the first sending manner, the first basic unit and/or the second basic unit is a basic unit indicated through signaling and/or a preset basic unit.

That is, in the first sending manner of this embodiment of the present disclosure, different WUSs are sent in different basic units so that a base station sends different WUSs in a switched manner.

It is to be noted that in this embodiment of the present disclosure, the ungrouped WUS refers to a WUS corresponding to all terminals in the same PO; and the grouped WUS refers to a WUS corresponding to each terminal group when all terminals in the same PO are grouped.

The second sending manner is determining, according to a preset condition, whether a third WUS or a fourth WUS is sent in a basic unit.

In this embodiment of the present disclosure, in the second sending manner, the preset condition includes at least one of: a terminal type, the length of a PDCCH search space, the length of a WUS search space, a WUS sending length or the number of groups.

In the second sending manner of this embodiment of the present disclosure, the sending unit 31 of this embodiment of the present disclosure performs the operations below.

In the case where the preset condition is the terminal type, the sending unit 31 is further configured to determine that the third WUS is sent in the basic unit in the case where W terminals among terminals corresponding to the basic unit each have a coverage enhancement type, in the case where Z terminals among the terminals corresponding to the basic unit each are in the coverage enhancement mode or in the case where the number of types of the terminals corresponding to the basic unit exceeds a preset number; otherwise, determine that the fourth WUS is sent in the basic unit. W and Z each are a positive integer greater than 1. In the case where the preset condition is the length of the PDCCH search space, the sending unit 31 is further configured to determine that the third WUS is sent in the basic unit in the case where the length of the PDCCH search space is greater than or equal to a first threshold; otherwise, determine that the fourth WUS is sent in the basic unit. In the case where the preset condition is the length of the WUS search space, the sending unit 31 is further configured to determine that the third WUS is sent in the basic unit in the case where the length of the WUS search space is greater than or equal to a second threshold; otherwise, determine that the fourth WUS is sent in the basic unit. In the case where the preset condition is the WUS sending length, the sending unit 31 is further configured to determine that the third WUS is sent in the basic unit in the case where the WUS sending length is greater than or equal to a third threshold; otherwise, determine that the fourth WUS is sent in the basic unit. In the case where the preset condition is the number of groups, the sending unit 31 is further configured to determine that the third WUS is sent in the basic unit when the number of groups is the first number of groups and determine that the fourth WUS is sent in the basic unit when the number of groups is the second number of groups.

It is to be noted that in this embodiment of the present disclosure, in the second sending manner, it is feasible to configure only one preset condition or configure several preset conditions in a combined manner. In practical implementation, those skilled in the art may perform configuration according to actual requirements. This is not limited in this embodiment of the present disclosure.

In practical implementation, in this embodiment of the present disclosure, the third WUS is an ungrouped WUS, and the fourth WUS is a grouped WUS; or the third WUS and the fourth WUS each are a grouped WUS.

In the case where the third WUS is an ungrouped WUS and the fourth WUS is a grouped WUS, the time-domain length of the third WUS is greater than the time-domain length of the fourth WUS.

In this embodiment of the present disclosure, in the case where the third WUS and the fourth WUS each are a grouped WUS, a sequence corresponding to the third WUS is a first sequence, and a sequence corresponding to the fourth WUS is a second sequence. The first sequence corresponds to the first number of groups, and the second sequence corresponds to the second number of groups.

That is, in this embodiment of the present disclosure, in the case of poor network connection or in the case where a terminal is in low-level configuration and in the coverage enhancement mode, the third WUS is sent in the basic unit by using the second sending manner so that the terminal can receive the WUS.

In this embodiment of the present disclosure, in the third sending manner, the first signaling includes first enable signaling.

In brief, a base station may send an ungrouped WUS when a grouped WUS is enabled.

In this embodiment of the present disclosure, in the fourth sending manner, the second signaling includes at least one of: the maximum number of groups corresponding to the fifth WUS, the minimum number of groups corresponding to the fifth WUS, the number of groups corresponding to the fifth WUS, or a change indication of the number of groups corresponding to the fifth WUS.

That is, in this embodiment of the present disclosure, all WUSs sent in the fourth sending manner are grouped WUSs.

Specifically, in this embodiment of the present disclosure, based on the maximum number of groups corresponding to the WUS or the minimum number of groups corresponding to the WUS within the signaling enable period, an interval is changed according to the number of groups corresponding to the WUS, and the grouped WUS corresponding to the fifth WUS is sent in a basic unit determined by using the preset signaling.

For example, assuming that the basic unit of this embodiment of the present disclosure is a DRX cycle and the number of groups corresponding to a grouped WUS is set to 2 by using higher-layer signaling (the preset maximum number of groups is 8), then each fifth WUS sent by a base station in the first DRX cycle within the signaling enable period is a grouped WUS corresponding to the number 2 of groups, each fifth WUS sent by the base station in the second DRX cycle within the signaling enable period is a grouped WUS corresponding to the number 4 of groups, each fifth WUS sent by the base station in the third DRX cycle within the signaling enable period is a grouped WUS corresponding to the number of groups: 8, each fifth WUS sent by the base station in the fourth DRX cycle within the signaling enable period is a grouped WUS corresponding to the number 2 of groups, and so on.

It is to be noted that in this embodiment of the present disclosure, the basic unit is at least one of M paging occasions (POs), N discontinuous reception (DRX) cycles, P enhanced discontinuous reception (eDRX) cycles or K radio frames. M, N, P and K each are a positive integer greater than 0.

In general, in this embodiment of the present disclosure, a base station predetermines grouping and changing rules with a terminal and sends a WUS to only a terminal corresponding to a PDCCH. Therefore, a terminal effectively avoids unnecessary detection of a PDCCH and thus the power loss of the terminal is reduced.

Content related to this embodiment of the present disclosure may be better understood with reference to related part in the first embodiment of the present application and is not described in detail here.

A sixth embodiment of the present application provides a wake-up signal (WUS) detection apparatus. Referring to FIG. 4, the apparatus includes a receiving unit 41 and a detection unit 42. The receiving unit 41 is configured to receive a WUS. The detection unit 42 is configured to detect the WUS by using at least one of: a first detection manner: performing detection in a first basic unit according to a first WUS and performing detection in a second basic unit according to a second WUS; a second detection manner: determining, according to a preset condition, whether detection is performed in a basic unit according to a third WUS, according to a fourth WUS or according to the third WUS and the fourth WUS; a third detection manner: determining, according to first signaling, whether detection is performed according to the fourth WUS or according to the third WUS and the fourth WUS; or a fourth detection manner: determining, according to second signaling, that detection is performed in the basic unit according to a fifth WUS.

In this embodiment of the present disclosure, a terminal receives a WUS according to a grouping rule predetermined with a base station and determines from the analysis of the received WUS whether to receive a PDCCH/PDSCH. Therefore, the terminal effectively avoids unnecessary detection of the PDCCH and thus the power loss of the terminal is reduced.

It is to be noted that in this embodiment of the present disclosure, the first WUS is an ungrouped WUS, and the second WUS is a grouped WUS; the third WUS is an ungrouped WUS and the fourth WUS is a grouped WUS; or the third WUS and the fourth WUS each are a grouped WUS; the fifth WUS is a grouped WUS.

In this embodiment of the present disclosure, the ungrouped WUS refers to a WUS corresponding to a PO where a terminal is located; and the grouped WUS refers to a WUS corresponding to a group where a terminal is located.

In order that the problem in which in the related art, all terminals in a PO are awakened when only some terminals need to be awakened is avoided, in this embodiment of the present disclosure, terminals in the same PO are grouped. A group obtained from the grouping may be preset or may be configured through signaling according to a terminal that currently needs to be awakened. WUSs are sent to terminals in the group. In this manner, the following problem is avoided: A terminal that does not need to be awakened also has to detect a PDCCH, and the effect of power loss reduction of the terminal is thus not apparent.

In this embodiment of the present disclosure, in the case where the third WUS is an ungrouped WUS and the fourth WUS is a grouped WUS, the time-domain length of the third WUS is greater than the time-domain length of the fourth WUS.

In this embodiment of the present disclosure, in the case where the third WUS and the fourth WUS each are a grouped WUS, a sequence corresponding to the third WUS is a first sequence, and a sequence corresponding to the fourth WUS is a second sequence. The first sequence corresponds to the first number of groups, and the second sequence corresponds to the second number of groups.

In the first detection manner, the first basic unit and/or the second basic unit is a basic unit indicated through signaling and/or a preset basic unit.

For example, in practical implementation, in this embodiment of the present disclosure, the terminal may obtain a DRX cycle index according to a radio frame index and a DRX cycle period and determine the preset basic unit in the first detection manner according to the DRX cycle index.

In this embodiment of the present disclosure, in the second detection manner, the preset condition includes at least one of: the length of a PDCCH search space or the length of a WUS search space.

In the case where the preset condition is the length of the PDCCH search space, the detection unit 42 is further configured to perform detection according to the third WUS in the case where the length of the PDCCH search space is greater than or equal to a first threshold; otherwise, perform detection according to the fourth WUS.

In the case where the preset condition is the length of the WUS search space, the detection unit 42 is further configured to perform detection according to the third WUS in the case where the length of the WUS search space is greater than or equal to a second threshold; otherwise, perform detection according to the fourth WUS.

That is, in this embodiment of the present disclosure, in the case of poor network connection or in the case where a terminal is in low-level configuration and in the coverage enhancement mode, the third WUS is sent in the basic unit by using the second sending manner so that the terminal can receive the WUS.

In this embodiment of the present disclosure, the first signaling is first enable signaling.

That is, the terminal determines a detection manner according to grouped WUS enable signaling.

In this embodiment of the present disclosure, in the fourth detection manner, the second signaling includes at least one of: the maximum number of groups corresponding to the fifth WUS, the minimum number of groups corresponding to the fifth WUS, the number of groups corresponding to the fifth WUS, or a change interval about the number of groups corresponding to the fifth WUS.

That is, in this embodiment of the present disclosure, all WUSs received in the fourth detection manner are grouped WUSs.

In this embodiment of the present disclosure, in the first detection manner, the preset basic unit is preset or is indicated through signaling.

It is to be noted that in this embodiment of the present disclosure, the basic unit is at least one of: M paging occasions (POs), N discontinuous reception (DRX) cycles, P enhanced discontinuous reception (eDRX) cycles or K radio frames. M, N, P and K each are a positive integer greater than 0.

Specifically, in this embodiment of the present disclosure, a terminal obtains a WUS by using a grouping rule predetermined with a base station and by analyzing a basic unit sent by the base station and determines, according to this WUS, whether to receive and analyze a PDCCH.

In general, the detection unit 42 of this embodiment of the present disclosure detects the received WUS according to the grouping rule predetermined with the base station, thereby determining whether to detect a PDCCH/PDSCH. The WUS is sent by the base station based on grouping. Therefore, the terminal of this embodiment of the present disclosure effectively avoids unnecessary detection of the PDCCH and thus the power loss of the terminal is reduced.

A seventh embodiment of the present application provides a base station. The base station includes the WUS sending apparatus of the fifth embodiment of the present application. For details, reference may be made to the fifth embodiment of the present application. The details are not described here.

An eighth embodiment of the present application provides a terminal. The terminal includes the WUS detection apparatus of the sixth embodiment of the present application. For details, reference may be made to the sixth embodiment of the present application. The details are not described here.

A ninth embodiment of the present application provides a computer-readable storage medium storing a computer program for signal mapping. When the computer program is executed by at least one processor, the following method and step are performed: sending a WUS by using at least one of a first sending manner: sending a first WUS in a first basic unit and sending a second WUS in a second basic unit; a second sending manner: determining, according to a preset condition, whether a third WUS or a fourth WUS is sent in a basic unit; a third sending manner: determining, according to first signaling, whether the fourth WUS is sent in the basic unit or one of the third WUS or the fourth WUS is sent in the basic unit; or a fourth sending manner: determining, according to second signaling and a basic unit index, a fifth WUS sent.

For details about the implementation process of the preceding method and step, reference may be made to the first embodiment of the present application. The details are not described in this embodiment.

A tenth embodiment of the present application provides a computer-readable storage medium storing a computer program for signal mapping. When the computer program is executed by at least one processor, the following method and steps are performed: receiving a WUS; and detecting the WUS by using at least one of a first detection manner: performing detection in a first basic unit according to a first WUS and performing detection in a second basic unit according to a second WUS; a second detection manner: determining, according to a preset condition, whether detection is performed in a basic unit according to a third WUS, according to a fourth WUS or according to the third WUS and the fourth WUS; a third detection manner: determining, according to first signaling, whether detection is performed in the basic unit according to the fourth WUS or according to the third WUS and the fourth WUS; or a fourth detection manner: determining, according to second signaling, that detection is performed in the basic unit according to a fifth WUS.

For details about the implementation process of the preceding method and steps, reference may be made to the second embodiment of the present application. The details are not described in this embodiment.

Additionally, it is to be noted that the storage medium and the computer-readable storage medium are the same medium in embodiments of the present disclosure.

It is to be noted that as used herein, the term "include", "contain" or any other variant thereof is intended to encompass a non-exclusive inclusion so that a process, method, article or apparatus that includes a series of elements not only includes these elements but also includes other elements that are not expressly listed or are inherent to such a process, method, article or apparatus. In the absence of more restrictions, the elements defined by the statement "include a . . . " do not exclude the presence of additional identical elements in the process, method, article or apparatus that includes the elements.

The serial numbers of the preceding embodiments of the present disclosure are for the purpose of illustration only and do not indicate superiority and inferiority of the embodiments.

From the description of the preceding embodiments, it is apparent to those skilled in the art that the method in the preceding embodiments may be implemented by software plus a necessary general-purpose hardware platform or may of course be implemented by hardware. However, in many cases, the former is a preferred implementation. Based on this understanding, the solution of the present application substantially or the part contributing to the related art may be embodied in the form of a software product. The software product is stored in a storage medium (such as a read-only memory (ROM)/random-access memory (RAM), a magnetic disk or an optical disk) and includes several instructions for enabling a terminal (which may be a mobile phone, a computer, a server, an air conditioner or a network device) to perform the method of each embodiment of the present application.

The preceding embodiments of the present application are described in connection with the drawings, but the present application is not limited to the preceding embodiments. The preceding embodiments are merely illustrative and not limiting. In light of the present application, those of ordinary skill in the art may make many forms without departing from the spirit of the present application and the scope of the claims, and all these are within the scope of the present application.

What is claimed is:

1. A wake-up signal (WUS) sending method, comprising:
sending a WUS by using:
a first sending manner: determining, according to a preset condition, whether a third first WUS or a second WUS is sent in a basic unit, wherein the first WUS is an ungrouped WUS, and the second WUS is a grouped WUS, and wherein the preset condition comprises at least one of: a terminal type, a length of a physical downlink control channel (PDCCH) search space, a length of a WUS search space, a WUS sending length or a number of groups;

or a second sending manner: determining, according to first signaling and a basic unit index, a third WUS sent in the basic unit, wherein the third WUS is a grouped WUS, and wherein the first signaling comprises at least one of: a maximum number of groups corresponding to the third WUS, a minimum number of groups corresponding to the third WUS, a number of groups corresponding to the third WUS, or a change indication of the number of groups corresponding to the third WUS;

wherein the basic unit is at least one of: M paging occasions (POs), N discontinuous reception (DRX) cycles, P enhanced discontinuous reception (eDRX) cycles or K radio frames, where M, N, P and K each are a positive integer greater than 0.

2. The method of claim 1, wherein
the ungrouped WUS refers to a WUS corresponding to all terminals in a same PO; and the grouped WUS refers to a WUS corresponding to each terminal group in response to all terminals in a same PO being grouped.

3. The method of claim 1, wherein
a time-domain length of the first WUS is greater than a time-domain length of the second WUS.

4. The method of claim 1, wherein
in a case where the preset condition is the terminal type, determining, according to the preset condition, whether the first WUS or the second WUS is sent in the basic unit comprises: determining that the first WUS is sent in the basic unit in a case where W terminals among terminals corresponding to the basic unit have a coverage enhancement type, in a case where Z terminals among the terminals corresponding to the basic unit are in a coverage enhancement mode or in a case where a number of types of the terminals corresponding to the basic unit exceeds a preset number; and determining that the second WUS is sent in the basic unit in a case where other than W terminals among the terminals corresponding to the basic unit have the coverage enhancement type, in a case where other than Z terminals among the terminals corresponding to the basic unit are in the coverage enhancement mode or in a case where the number of types of the terminals corresponding to the basic unit does not exceed the preset number, wherein W and Z each are a positive integer greater than 1;

in a case where the preset condition is the length of the PDCCH search space, determining, according to the preset condition, whether the first WUS or the second WUS is sent in the basic unit comprises: determining that the first WUS is sent in the basic unit in a case where the length of the PDCCH search space is greater than or equal to a first threshold and determining that the second WUS is sent in the basic unit in a case where the length of the PDCCH search space is less than the first threshold;

in a case where the preset condition is the length of the WUS search space, determining, according to the preset condition, whether the first WUS or the second WUS is sent in the basic unit comprises: determining that the first WUS is sent in the basic unit in a case where the length of the WUS search space is greater than or equal to a second threshold and determining that the second WUS is sent in the basic unit in a case where the length of the WUS search space is less than the second threshold;

in a case where the preset condition is the WUS sending length, determining, according to the preset condition, whether the first WUS or the second WUS is sent in the basic unit comprises: determining that the first WUS is sent in the basic unit in a case where the WUS sending length is greater than or equal to a third threshold and determining that the second WUS is sent in the basic unit in a case where the WUS sending length is less than the third threshold; and in a case where the preset condition is the number of groups, determining, according to the preset condition, whether the first WUS or the second WUS is sent in the basic unit comprises: determining that the first WUS is sent in the basic unit in a case where the number of groups is a first number of groups and determining that the second WUS is sent in the basic unit in a case where the number of groups is a second number of groups.

5. A wake-up signal (WUS) receiving method, comprising:

receiving a WUS; and detecting the WUS by using:

a first detection manner: determining, according to a preset condition, whether detection is performed in a basic unit according to a first WUS, according to a second WUS or according to the first WUS and the second WUS, wherein the first WUS is an ungrouped WUS, and the second WUS is a grouped WUS, and wherein the preset condition comprises at least one of: a length of a physical downlink control channel (PDCCH) search space or a length of a WUS search space;

or a fourth second detection manner: determining, according to first signaling, that detection is performed in the basic unit according to a third WUS, wherein the third WUS is a grouped WUS, and wherein the first signaling comprises at least one of: a maximum number of groups corresponding to the third WUS, a minimum number of groups corresponding to the third WUS, a number of groups corresponding to the third WUS, or a change indication of the number of groups corresponding to the third WUS;

wherein the basic unit is at least one of M paging occasions (POs), N discontinuous reception (DRX) cycles, P enhanced discontinuous reception (eDRX) cycles or K radio frames, where M, N, P and K are each a positive integer greater than 0.

6. The method of claim 5, wherein
the ungrouped WUS refers to a WUS corresponding to a PO where a terminal is located; and
the grouped WUS refers to a WUS corresponding to a group where a terminal is located.

7. The method of claim 5, wherein
a time-domain length of the first WUS is greater than a time-domain length of the second WUS.

8. The method of claim 5, wherein
in a case where the preset condition is the length of the PDCCH search space, determining, according to the preset condition, whether detection is performed in the basic unit according to the first WUS or according to the second WUS comprises: performing detection according to the first WUS in a case where the length of the PDCCH search space is greater than or equal to a first threshold and performing detection according to the second WUS in a case where the length of the PDCCH search space is less than the first threshold; and in a case where the preset condition is the length of the WUS search space, determining, according to the preset condition, whether detection is performed in the basic unit according to the first WUS or according to the second WUS comprises: performing detection according to the first WUS in a case where the length of the WUS search space is greater than or equal to a second threshold and performing detection according to the second WUS in a case where the length of the WUS search space is less than the second threshold.

9. A wake-up signal (WUS) receiving apparatus, comprising:
   a processor and a memory storing processor-executable instructions which, when executed by the processor, are configured to implement the method of claim 5.

10. A wake-up signal (WUS) sending apparatus, comprising:
   a sending unit configured to send a WUS by:
   a first sending manner: determining, according to a preset condition, a first WUS or a second WUS sent in a basic unit, wherein the first WUS is an ungrouped WUS, and the second WUS is a grouped WUS, and wherein the preset condition comprises at least one of: a terminal type, a length of a physical downlink control channel (PDCCH) search space, a length of a WUS search space, a WUS sending length or a number of groups; or
   a second sending manner: determining, according to first signaling and a basic unit index, a third WUS sent in the basic unit, wherein the third WUS is a grouped WUS, and wherein the first signaling comprises at least one of: a maximum number of groups corresponding to the third WUS, a minimum number of groups corresponding to the third WUS, a number of groups corresponding to the third WUS, or a change indication of the number of groups corresponding to the third WUS;
   wherein the basic unit is at least one of: M paging occasions (POs), N discontinuous reception (DRX) cycles, P enhanced discontinuous reception (eDRX) cycles or K radio frames, where M, N, P and K each are a positive integer greater than 0.

\* \* \* \* \*